C. M. DEEKS.
WEED ROOT CUTTER.
APPLICATION FILED SEPT. 27, 1910.
1,025,965.
Patented May 14, 1912.
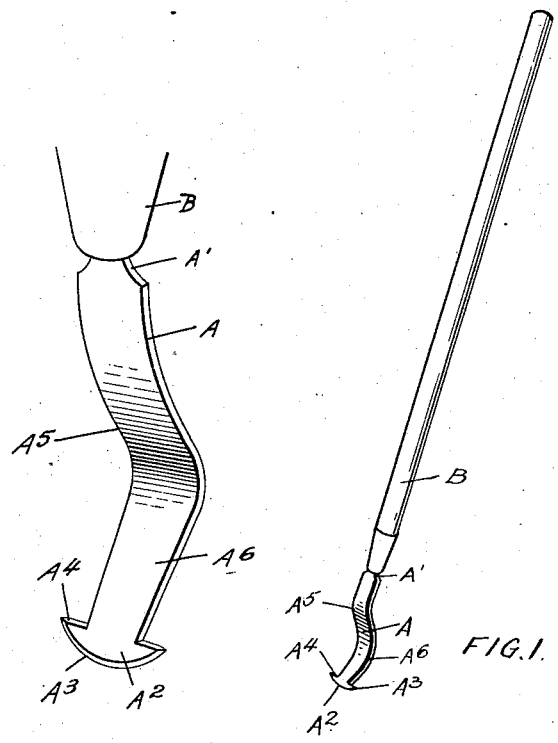

UNITED STATES PATENT OFFICE.

CATHARINE MALINDA DEEKS, OF TORONTO, ONTARIO, CANADA, ASSIGNOR TO MABEL C. L. DEEKS, FLORENCE A. DEEKS, AND ANNIE E. DEEKS, OF TORONTO, CANADA.

WEED-ROOT CUTTER.

1,025,965. Specification of Letters Patent. Patented May 14, 1912.

Application filed September 27, 1910. Serial No. 584,111.

*To all whom it may concern:*

Be it known that I, CATHARINE MALINDA DEEKS, of the city of Toronto, in the county of York, in the Province of Ontario, Canada, have invented certain new and useful Improvements in Weed-Root Cutters, of which the following is the specification.

My invention relates to improvements in weed root cutters as described in the following specification and illustrated in the accompanying drawings that form part of the same.

The objects of the invention are, to simplify and render less arduous the work of removing weeds from lawns, and to devise a cheap and simple form of tool which will sever the root below the surface of the ground without injury to the surrounding sod and will remove the severed top of the weed on the withdrawal of the tool.

The invention consists essentially in the novel formation of the blade whereby the cutting edge is caused to move in a transverse direction to sever the weed root on a downward thrust on the handle and whereby it cuts its way out of the sod and presents a dull edged cleft to the severed top of the root on removal.

Figure 1 is a general perspective view of my instrument. Fig. 2, is an enlarged view of the lower portion of the instrument showing it applied to the cutting of a root. Fig. 3 is an enlarged perspective view of the blade of the instrument.

In the drawings like letters of reference indicate corresponding parts in each figure.

A is the blade of the instrument having the shank $A^1$ secured in the handle B. The blade A is formed of a broad, flat piece of thin steel having a cutting head $A^2$ at its extremity formed of considerably greater width than the upper portion.

The head $A^2$ is formed with an arc-shaped cutting edge $A^3$, the blunt upper edges $A^4$ meet the sides of the main portion of the blade at substantially right angles, the body of the blade being slightly tapered toward the said head.

The blade A is formed with a curved offset $A^5$ close to the shank and the lower straight portion $A^6$ is set at a sharp forward and downward angle.

In using this device, the forwardly sloping end of the blade is inserted under the leaves of the weed and the cutting edge placed close to the root. A downward thrust on the handle forces the cutting edge into the sod and the flat angularly set blade offering resistance to the straight downward travel causes the cutting edge to move in a transverse direction thereby severing the root with a transverse cut below the surface of the ground. The handle is then tilted slightly to one side so that the arc shaped cutting edge will cut its way clear on the removal of the blade and the upper edge of the head projecting beyond the blade presents a dull edged cleft in which the severed top of the root lodges and is removed with the blade. The dull edges will not cut the upper part of the root but remove it entire, the point formed by the corner of the blade sticks into the lower leaves thus holding the severed top on the blade so that it can be placed in a suitable receptacle without being handled.

What I claim as my invention is:

1. A weed root cutter, comprising, a suitable handle, and a broad thin blade formed with its lower end set in inclined relation to the axis of the handle and having a cutting head of greater width than the body portion, said head having an arc-shaped cutting edge.

2. A weed root cutter, comprising, a suitable handle and a broad flat blade of thin material formed with a curved offset and an angularly set extremity terminating in a cutting end of greater width than said blade, said cutting end having an arc-shaped cutting edge and dull upper edges extending inwardly to the main portion of the blade.

CATHARINE MALINDA DEEKS.

Witnesses:
B. BOYD,
H. PRESTON.